(12) United States Patent
Faltenbacher et al.

(10) Patent No.: US 10,457,434 B2
(45) Date of Patent: Oct. 29, 2019

(54) METHOD AND APPARATUS FOR PACKAGING INJECTION MOULDINGS

(71) Applicant: HEKUMA GMBH, Eching (DE)

(72) Inventors: Christian Faltenbacher, München (DE); Jakob Kammerloher, Wolfersdorf (DE)

(73) Assignee: HEKUMA GMBH, Eching (DE)

( * ) Notice: Subject to any disclaimer, the term of this patent is extended or adjusted under 35 U.S.C. 154(b) by 580 days.

(21) Appl. No.: 15/027,161

(22) PCT Filed: Oct. 2, 2014

(86) PCT No.: PCT/EP2014/071192
§ 371 (c)(1),
(2) Date: Apr. 4, 2016

(87) PCT Pub. No.: WO2015/049350
PCT Pub. Date: Apr. 9, 2015

(65) Prior Publication Data
US 2016/0244193 A1 Aug. 25, 2016

(30) Foreign Application Priority Data

Oct. 2, 2013 (DE) .................. 10 2013 110 948

(51) Int. Cl.
*B65B 35/56* (2006.01)
*B29C 45/42* (2006.01)
(Continued)

(52) U.S. Cl.
CPC .......... *B65B 35/56* (2013.01); *B29C 45/1769* (2013.01); *B29C 45/42* (2013.01);
(Continued)

(58) Field of Classification Search
CPC ... B01L 9/54; B65B 35/56; B65B 5/06; B65B 35/30; B65B 5/068; B65B 5/105;
(Continued)

(56) References Cited

U.S. PATENT DOCUMENTS 4,642,967 A * 2/1987 Culpepper .............. B65B 35/44
198/419.1
5,653,934 A * 8/1997 Brun, Jr. ................ B29C 33/30
264/334
(Continued)

FOREIGN PATENT DOCUMENTS

EP          2 323 930 B1    1/2011
WO    WO 2011/003507 A1    1/2011
(Continued)

*Primary Examiner* — Nathaniel C Chukwurah
*Assistant Examiner* — Mobeen Ahmed
(74) *Attorney, Agent, or Firm* — Horst M. Kasper, Esq.

(57) ABSTRACT

Method for transferring injection moldings, in particular pipette tips (P), out of an injection-molding machine into packaging containers (V1 to V4), comprising the following steps: removing the injection moldings (P) in an annular arrangement from a mold (W) of the injection-molding machine by way of a removable gripper (100), converting the annular arrangement into a row arrangement of the injection moldings (P) in a transfer station (101), positioning the injection moldings (P) in the transfer station (101) in a manner corresponding to the positioning in a workpiece carrier (102), and transferring the injection moldings (P) into the workpiece carrier (102) by way of the transfer station (101), whereupon the injection moldings (P) are inserted into the packaging containers (V1 to V4) from the workpiece carrier (102).

7 Claims, 16 Drawing Sheets

Figure 10:
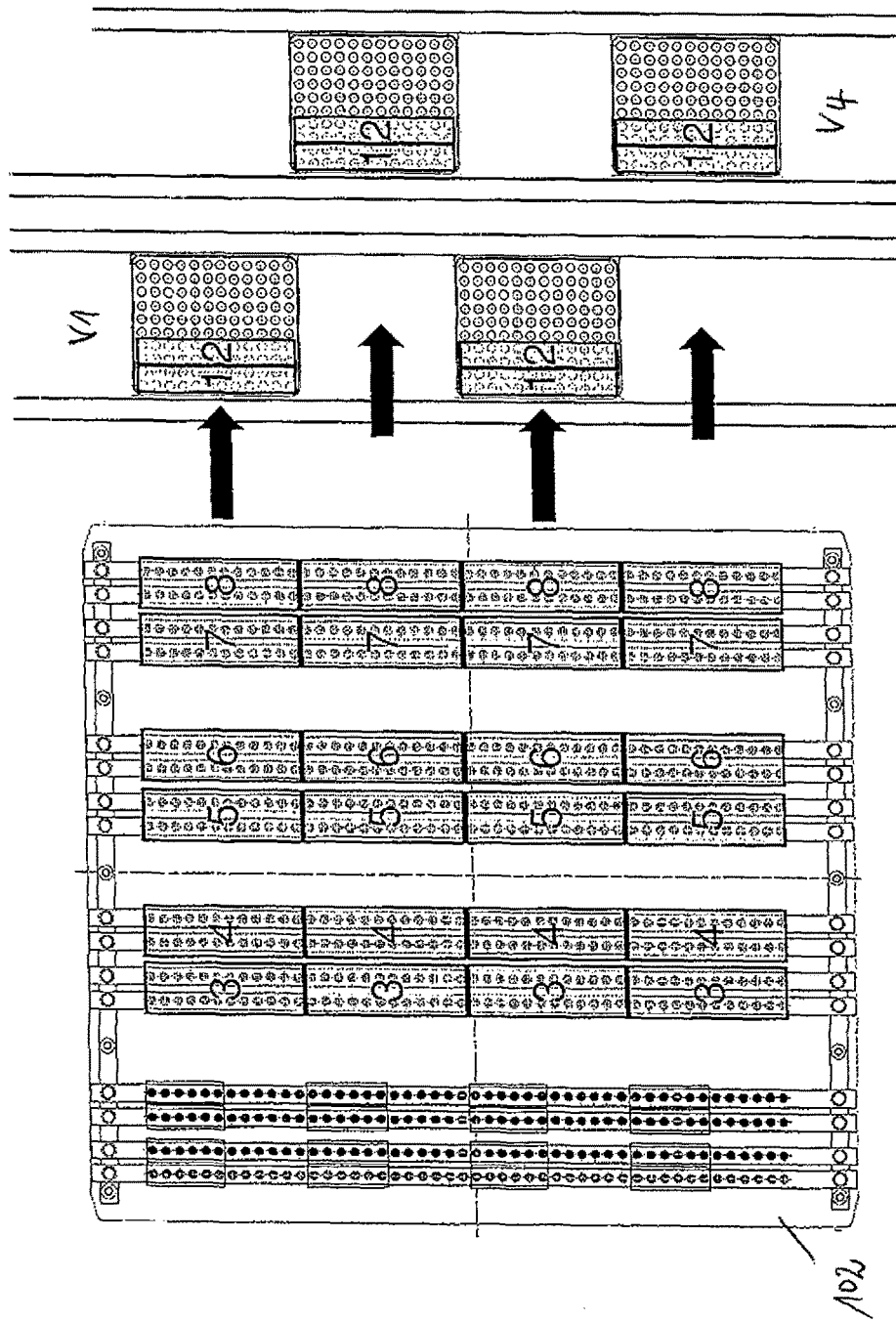

(51) Int. Cl.
- B29C 45/17 (2006.01)
- B65B 5/06 (2006.01)
- B65B 35/30 (2006.01)
- B65B 35/16 (2006.01)
- B65B 25/00 (2006.01)
- B65B 35/36 (2006.01)
- B65B 5/10 (2006.01)
- B29C 45/40 (2006.01)
- B29L 31/00 (2006.01)

(52) U.S. Cl.
CPC ............ B29C 45/4225 (2013.01); B65B 5/06 (2013.01); B65B 35/30 (2013.01); B29C 2045/4073 (2013.01); B29L 2031/7544 (2013.01); B65B 5/068 (2013.01); B65B 5/105 (2013.01); B65B 25/00 (2013.01); B65B 35/16 (2013.01); B65B 35/36 (2013.01)

(58) Field of Classification Search
CPC ......... B65B 25/00; B65B 35/16; B65B 35/36; B29C 45/4225; B29C 45/1769; B29C 45/42; B29C 2045/4073; B29L 2031/7544
USPC ......... 53/443, 448, 473, 539, 543, 236, 247, 53/251; 198/460.3, 462.2, 462.1, 462.3
See application file for complete search history.

(56) References Cited

U.S. PATENT DOCUMENTS

| 5,855,104 | A  | * | 1/1999  | Schlagel  | B65B 25/008 |
|           |    |   |         |           | 53/495      |
| 7,451,584 | B2 | * | 11/2008 | Schateikis | B65G 47/71 |
|           |    |   |         |           | 53/147      |
| 9,956,708 | B2 | * | 5/2018  | Thoemmes  | B29C 45/261 |
| 2012/0124945 | A1 | * | 5/2012 | Boos     | B65B 35/30 |
|           |    |   |         |           | 53/452      |

FOREIGN PATENT DOCUMENTS

| WO | WO2014/121868 A1 |   | 8/2014 |           |
|----|------------------|---|--------|-----------|
| WO | WO 2014121868 A1 | * | 8/2014 | B29C 45/42 |

\* cited by examiner

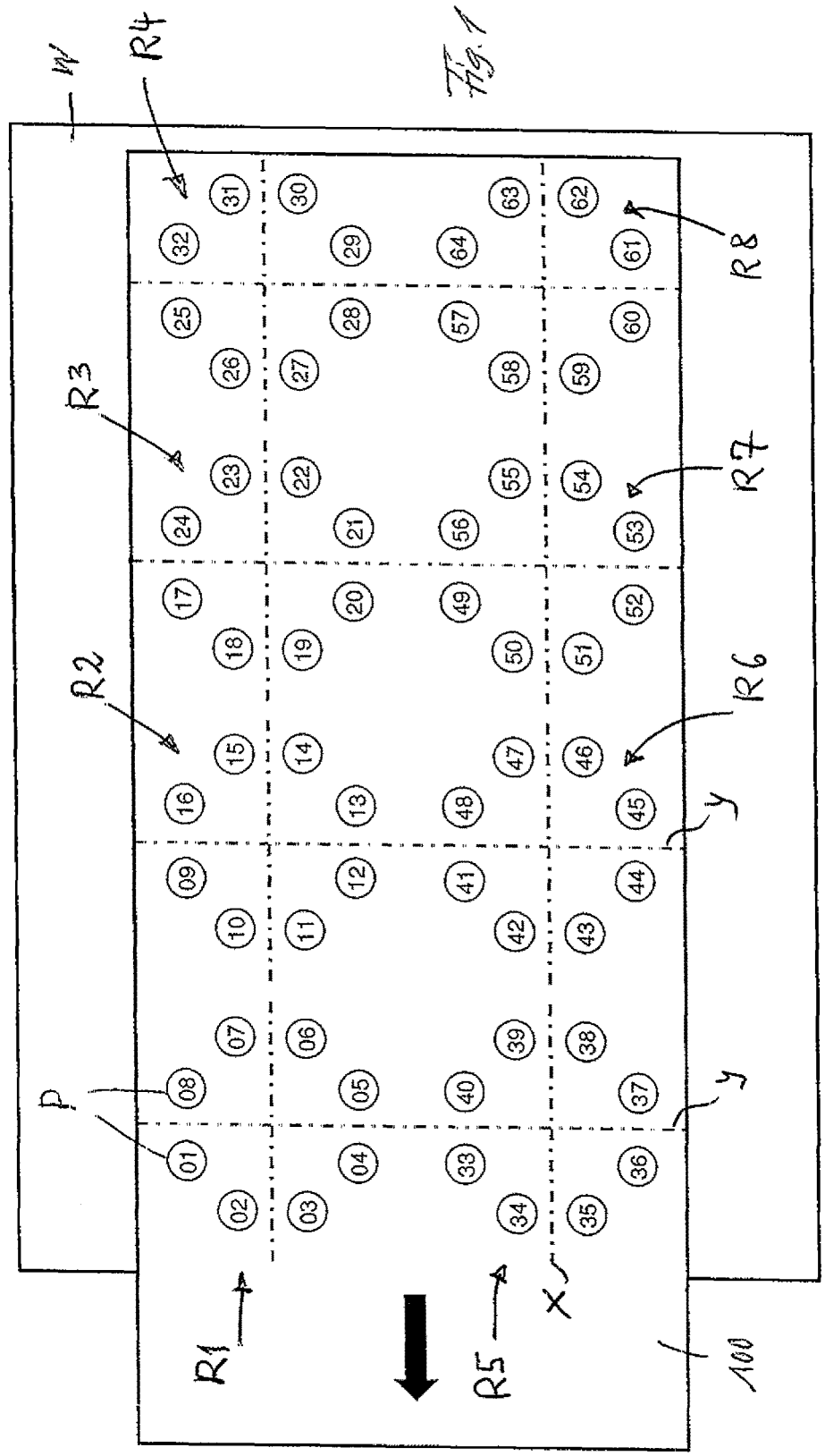

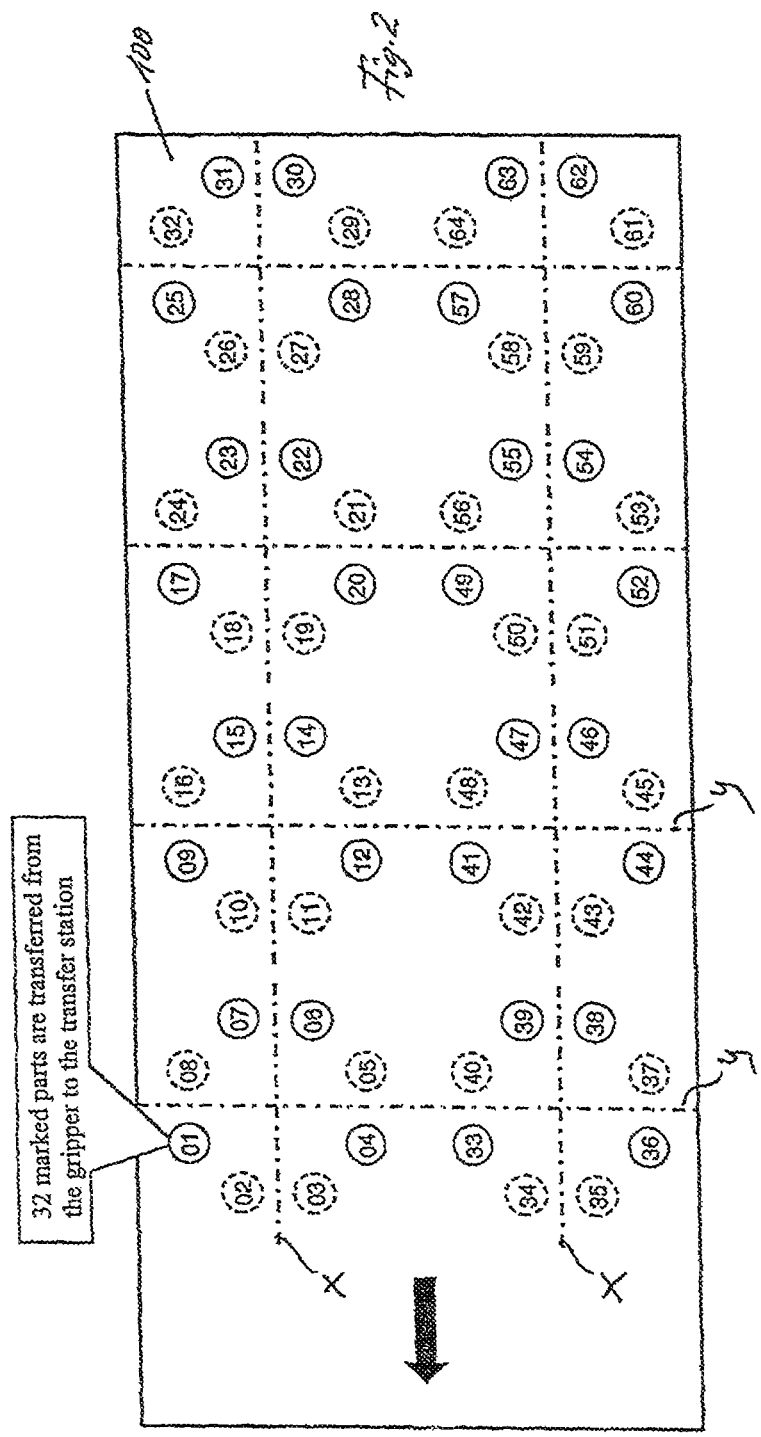

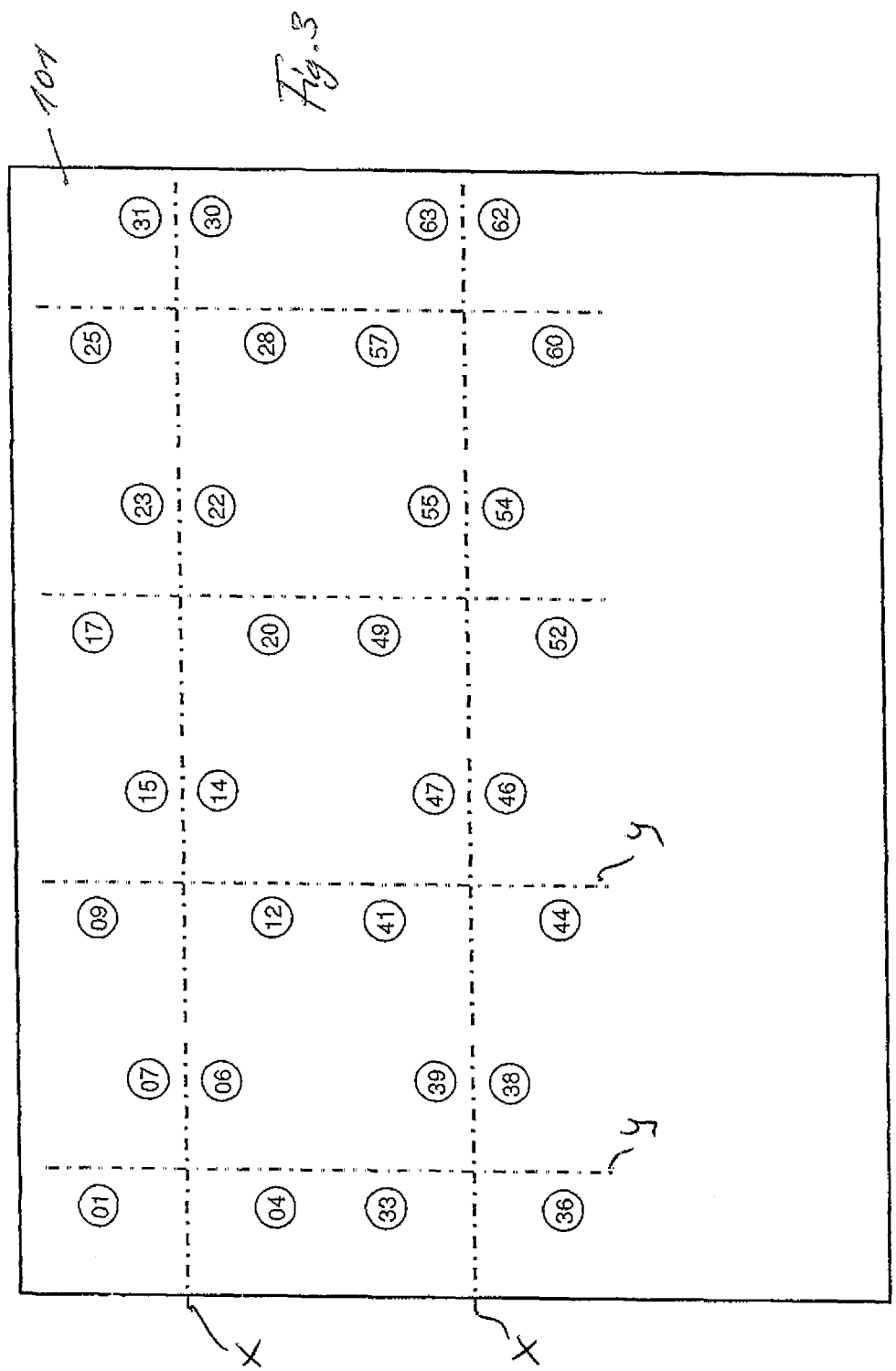

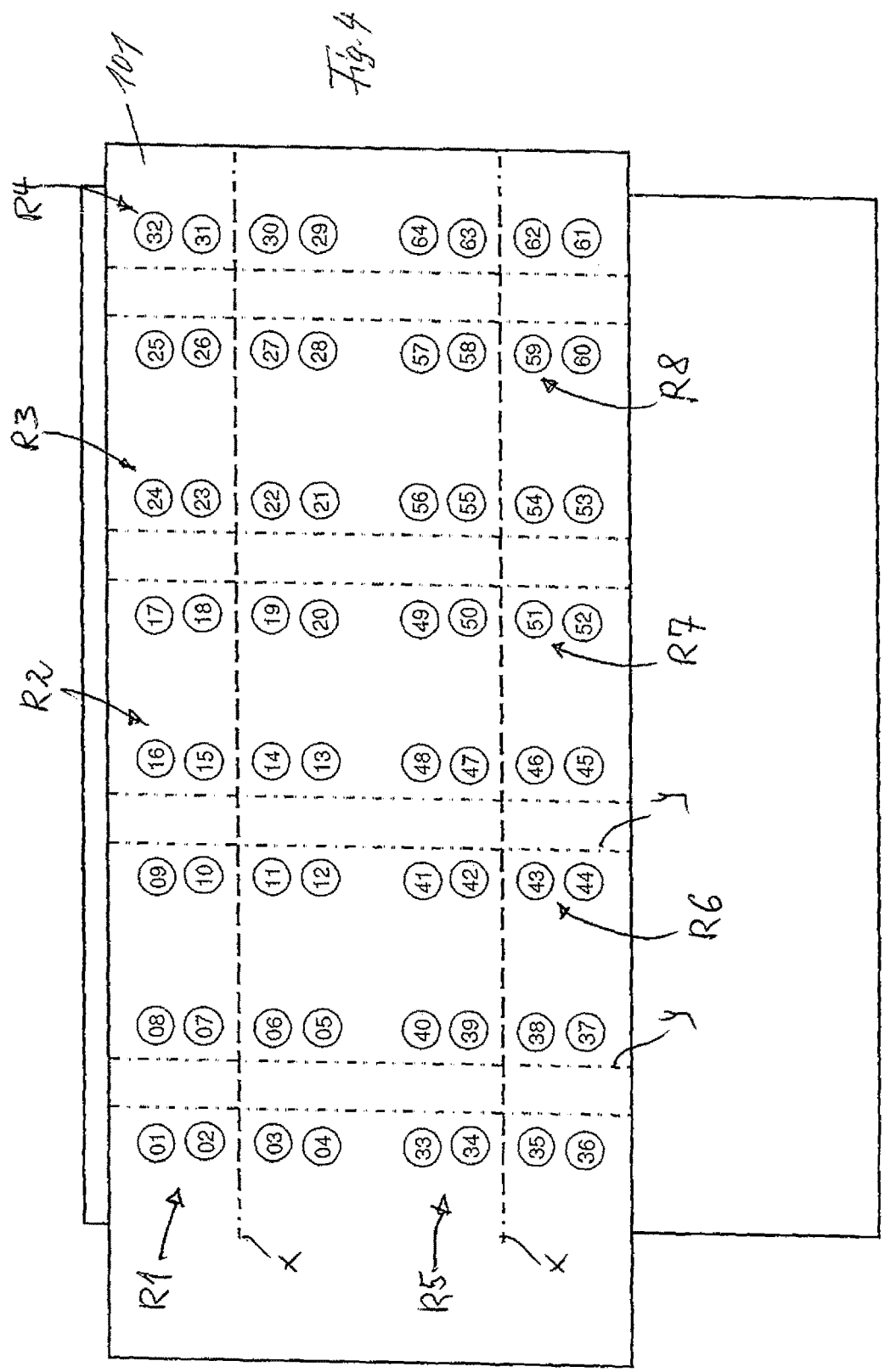

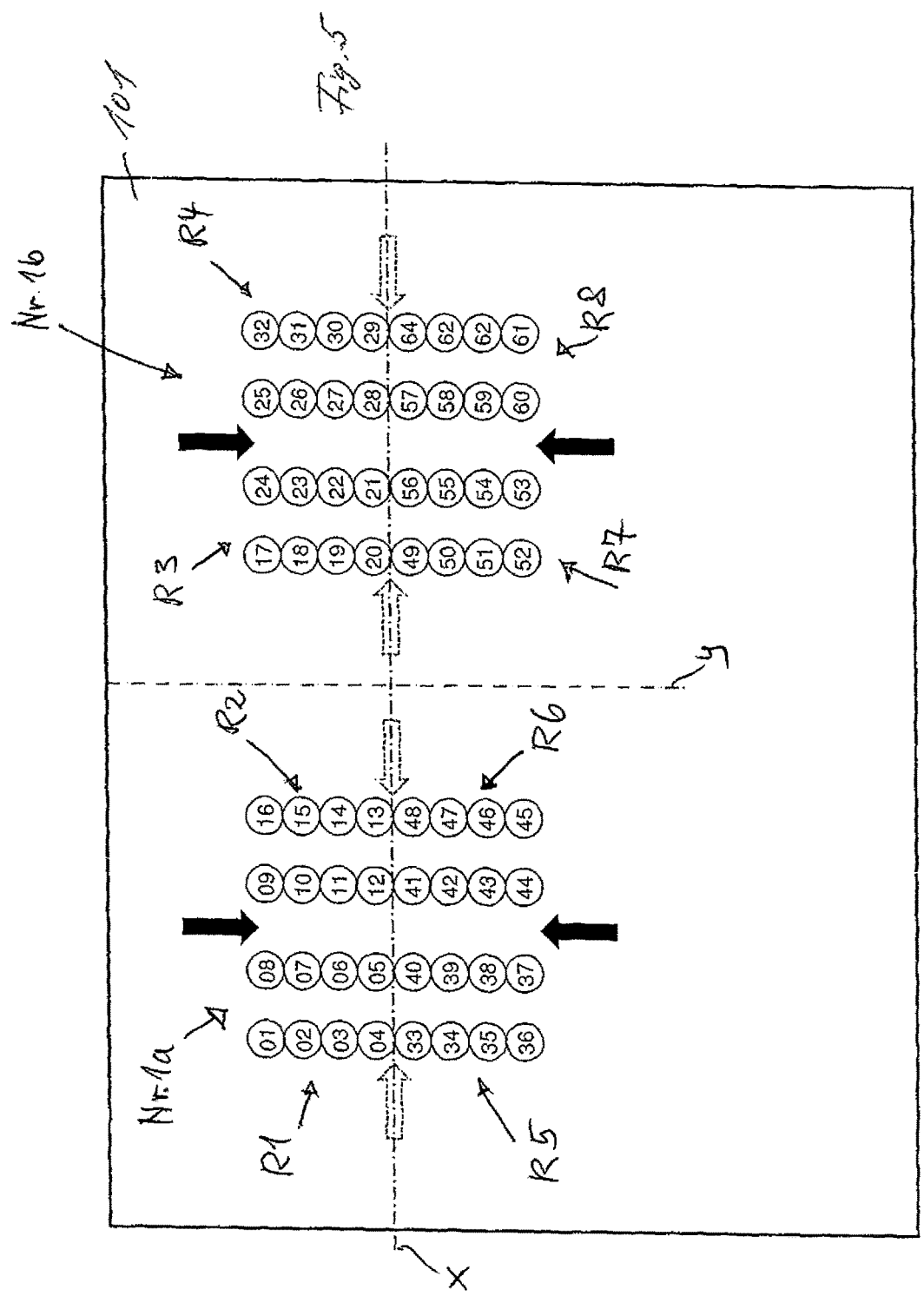

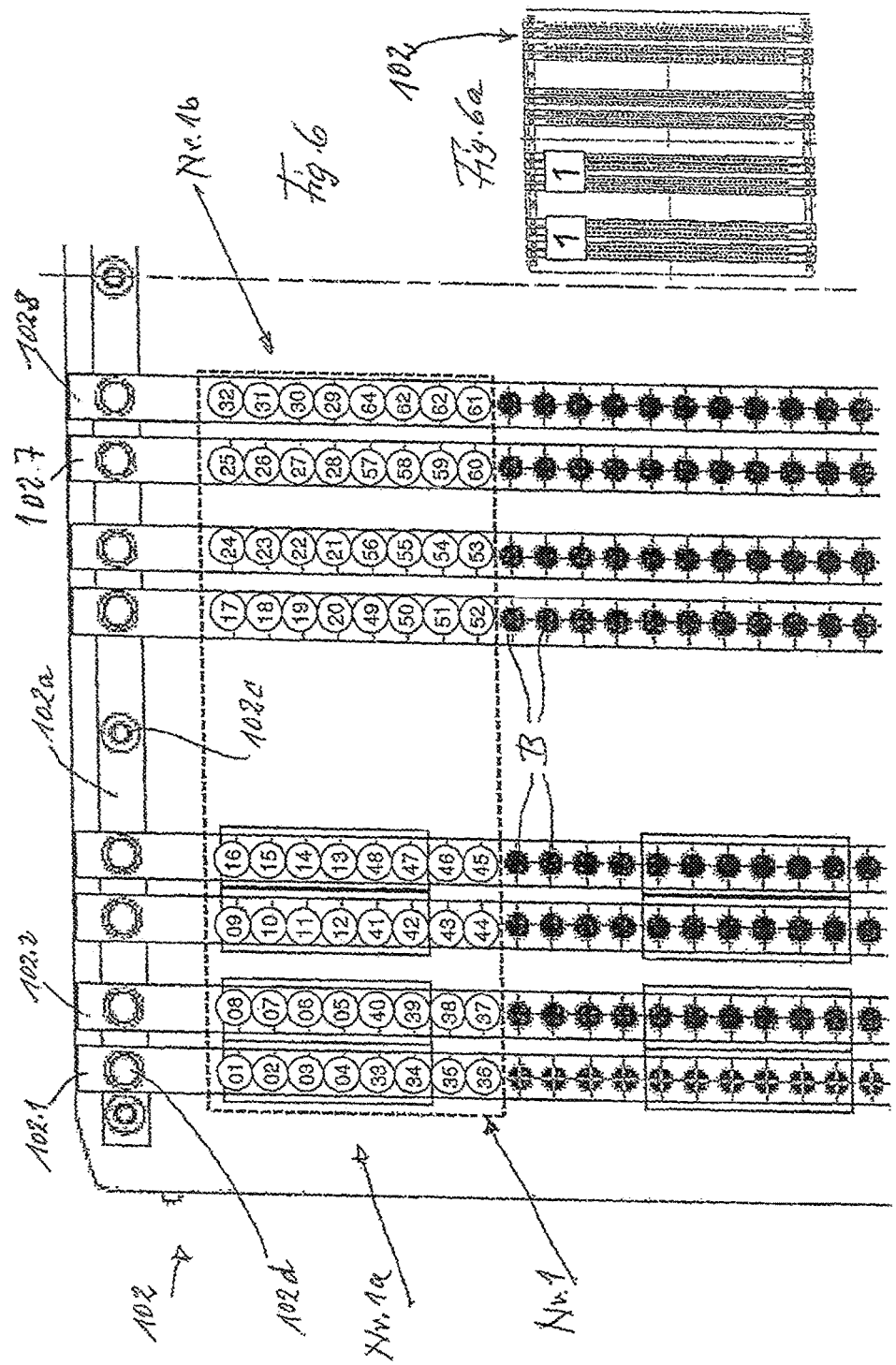

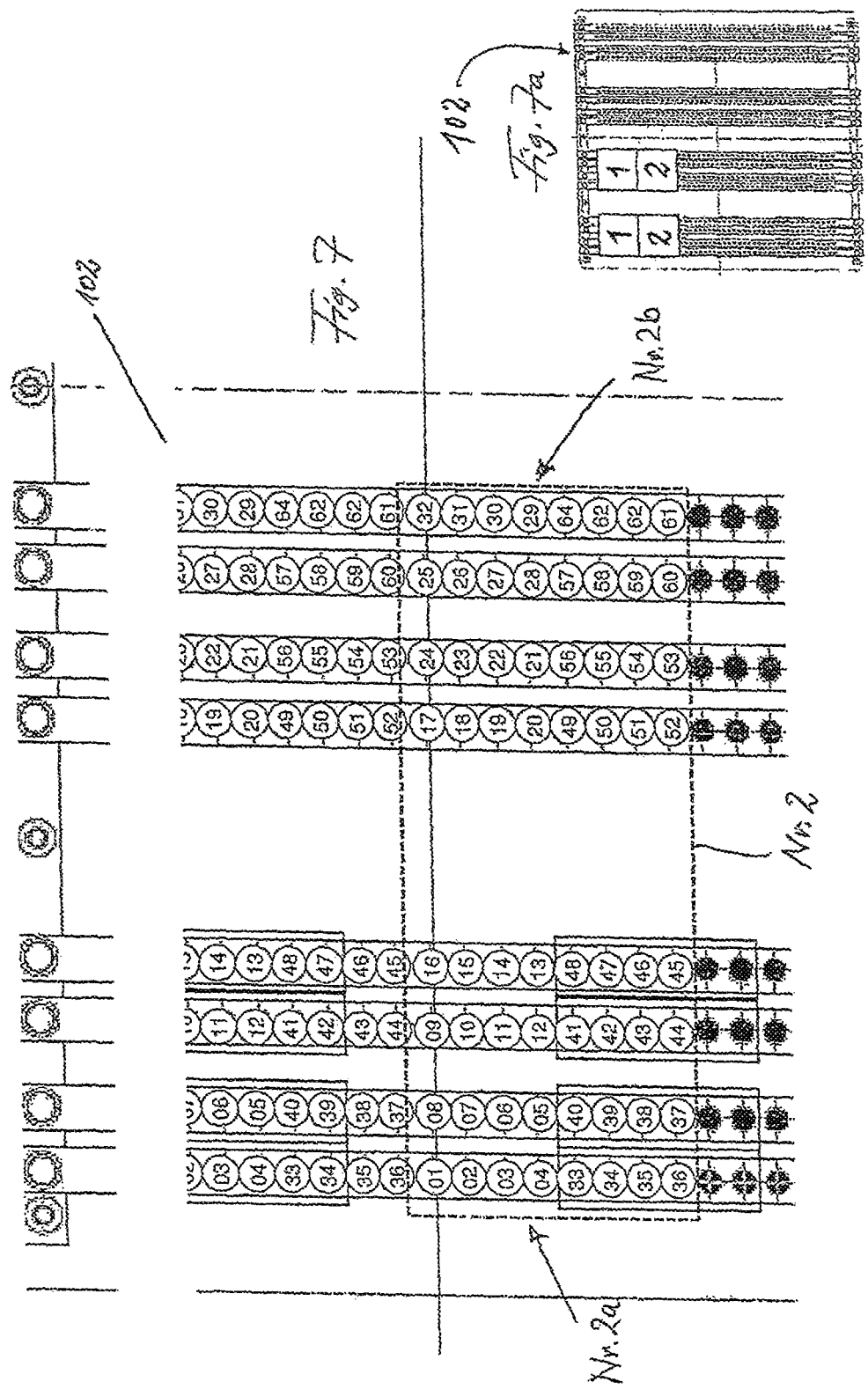

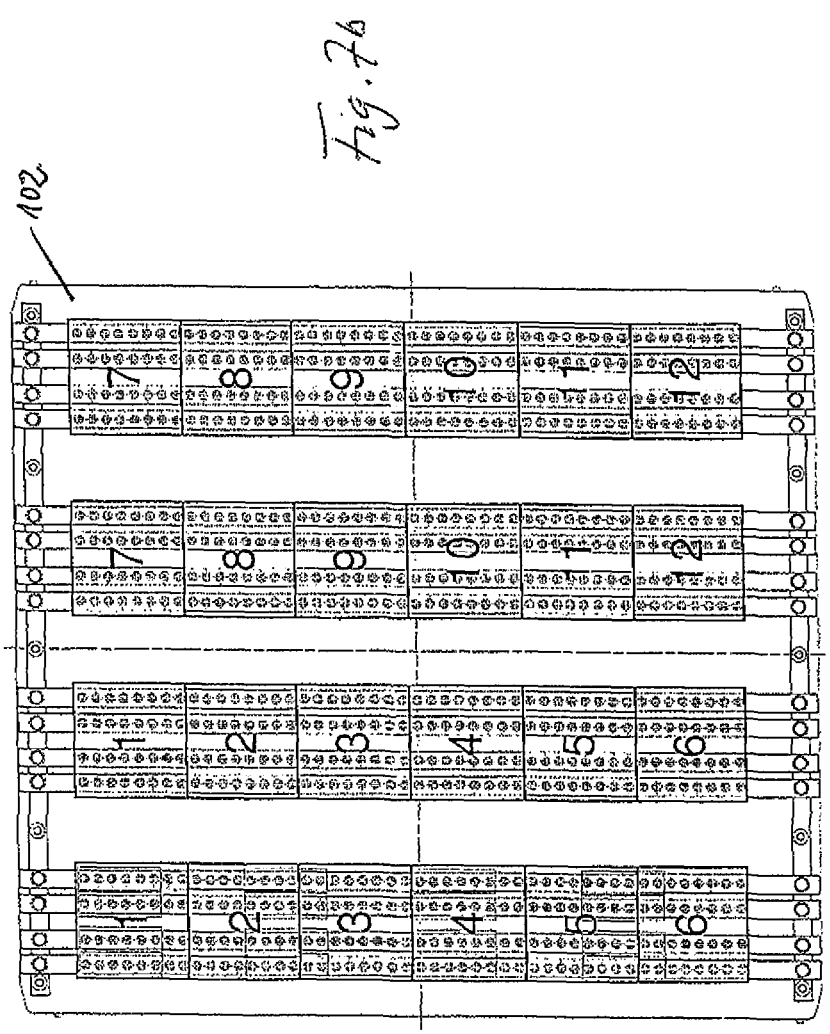

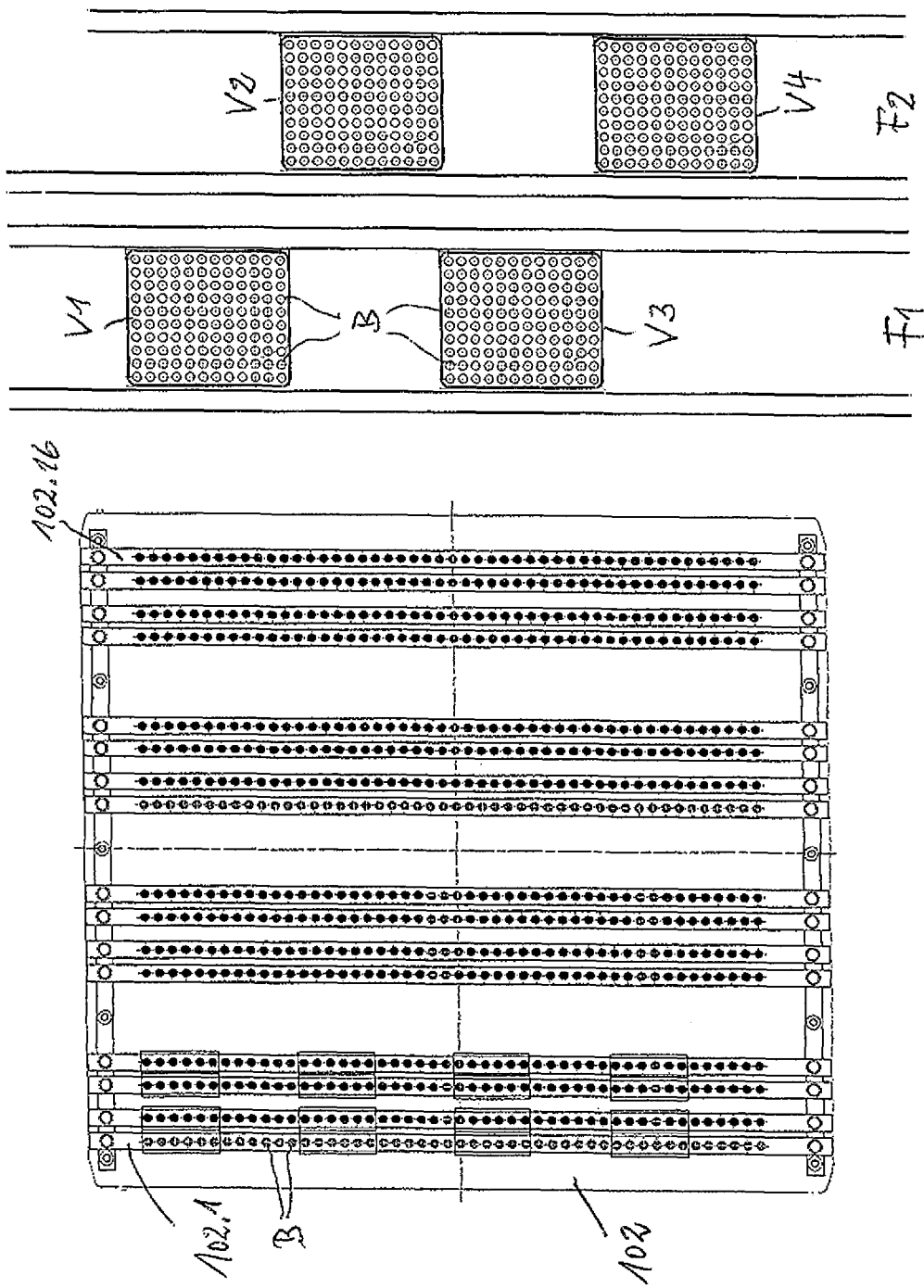

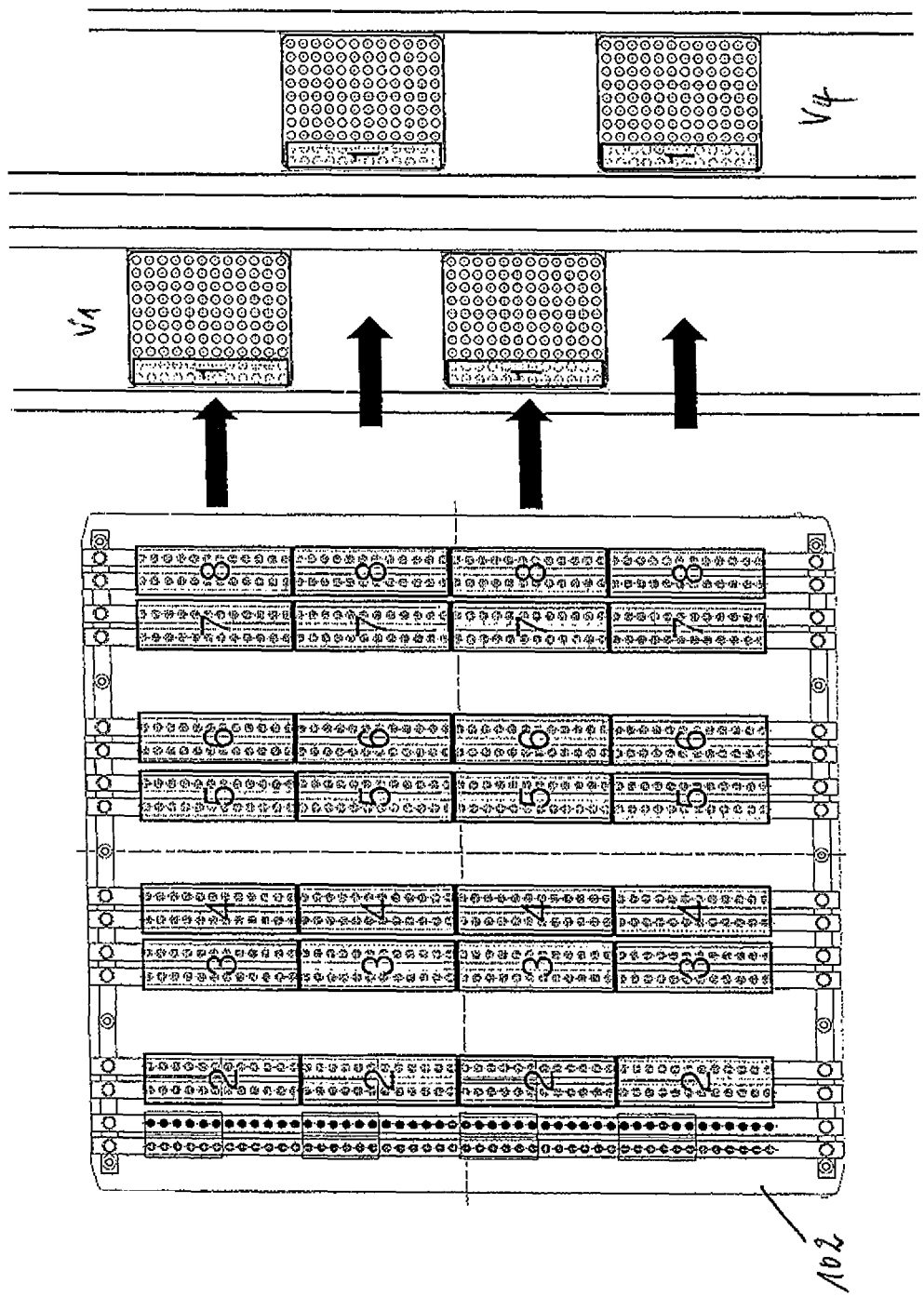

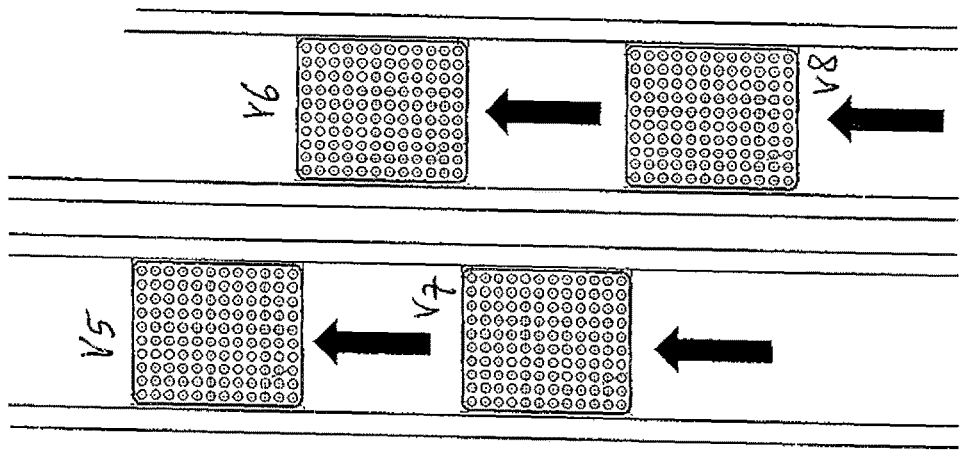
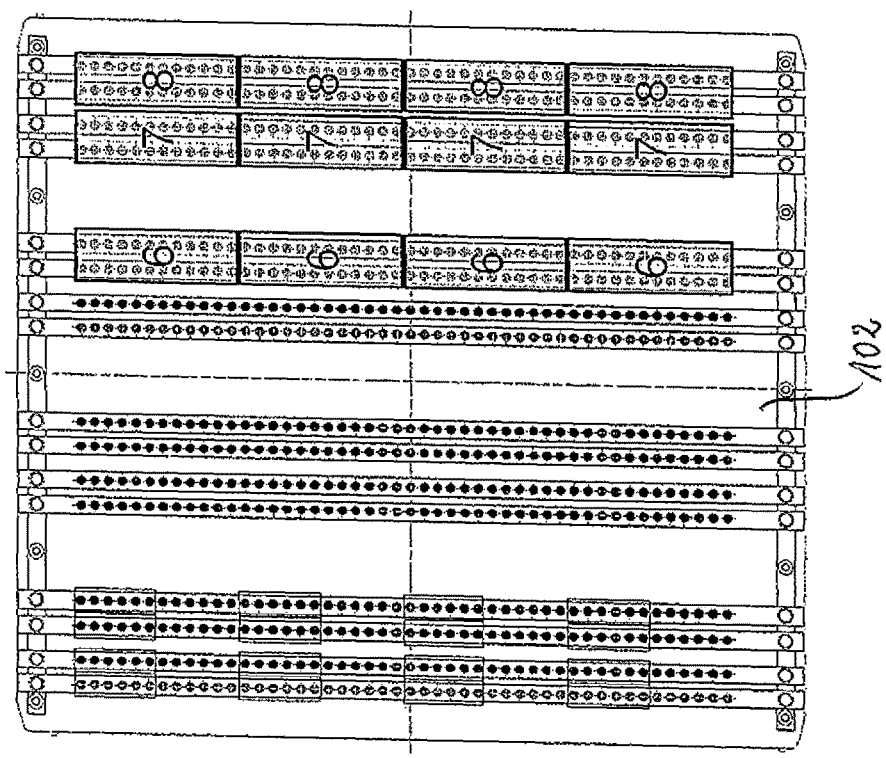
Fig. 12

METHOD AND APPARATUS FOR PACKAGING INJECTION MOULDINGS

The invention relates to a method and a device for packing injection-molded parts, especially of medical reaction vessels like pipette tips, wherein the injection-molded parts are transferred from the injection molding machine to packing containers.

From EP 2 323 930, such a method is known, wherein the pipette tips withdrawn from the injection molding machine are deposited according to a predetermined pattern one after the other in an intermediate storage for forming groups, which each include pipette tips from a determined cavity of the injection molding tool. When the Predetermined groups are filled up in the intermediate storage, which are matched to the capacity of a packing container, the pipette tips are transferred from the intermediate storage in groups according to their cavity number into the packing containers.

In this method, a certain effort is necessary in order to group the pipette tips in the predetermined pattern in the intermediate storage in adaptation to the packing containers.

The invention is based on the object of simplifying and accelerating the course of transferring the injection-molded parts from the injection molding machine to the packing containers.

This object is solved according to the invention essentially in that the injection-molded parts, arranged in an annular manner in the injection molding machine and withdrawn in annular arrangement, are configured in line in a transfer station, wherein the injection-molded parts arranged in rows in the transfer station are adapted to the positioning in a workpiece holder and are transferred altogether as a block of rows from the transfer station to the workpiece holder, from where the packing containers are charged according to requirement.

According to the invention, a method is provided for transferring injection-molded parts, especially pipette tips, from an injection molding machine into packing containers, which includes the steps of withdrawing the injection-molded parts in annular arrangement from a tool of the injection molding machine by means of a withdrawal grab, transferring the annular arrangement into an in-line configuration of the injection-molded parts in a transfer station, positioning the injection-molded parts in the transfer station corresponding to the positioning in a workpiece holder separate therefrom and transferring the injection-molded parts into the workpiece holder via the transfer station, whereupon the injection molded parts from the workpiece holder are inserted into the packing containers, if appropriate with interposition of quality inspection.

Advantageously, groups of rings of injection-molded parts are transferred at the withdrawal grab in groups of rows in the transfer station, such that, in two steps, the withdrawal grab inserts in each case a predetermined number of injection-molded parts into the transfer station, wherein in the first step a first row formation takes place and in the second step a completion of the row formation in the transfer station.

Advantageously, in the withdrawal grab along a straight line, injection-molded parts facing each other are withdrawn from the ring configuration and transferred into an in-line configuration in the transfer station, whereupon the remaining injection-molded parts of the ring configuration, which face each other along a straight line, complete the already present in-line configuration in the transfer station, so that, from a ring configuration of injection-molded parts at the withdrawal grab, at least a row is formed in the transfer station.

Advantageously, two rows facing each other are formed of a ring configuration.

After the transferring of the injection-molded parts by the withdrawal grab into the transfer station, the injection-molded parts in the transfer station, by means of moving of individual injection-molded parts and/or of sections of the individual rows, are compacted relative to each other into a compact in-line configuration, in which the injection-molded, parts and if applicable the rows of the injection-molded parts have a predetermined distance from each other, which corresponds to the positioning in the workpiece holder located downstream. In other words, the positioning of the injection-molded parts in the transfer station is carried out such that it corresponds to the positioning of the injection-molded parts in the workpiece holder, so that the injection-molded parts can be transferred from the transfer station directly into the workplace holder.

To achieve a short cycle time, it is advantageous if the compaction and positioning of the injection-molded parts in the transfer station takes place corresponding to the Positioning in the workpiece holder during the withdrawing and pivoting of the transfer station by means of the workpiece holder, wherein the injection-molded parts can be inserted directly from the transfer station into the workpiece holder at the end of the pivoting process of the transfer station.

When the workpiece holder receives a plurality of rows of blocks each corresponding to a shot of the injection-molding machine, for the charging of the workpiece holder the transfer station is moved and displaced, during charging, along a row in the workpiece holder, while for receiving further rows, the workpiece holder itself is displaced transverse to the longitudinal extension of the rows relative to the transfer station.

According to the invention, a packing device comprises, especially for carrying out the method, a withdrawal grab having annular arrangement of groups of grabs for injection-molded parts corresponding to the annular arrangement of the injection-molded parts in cavities of an injection molding tool,
a transfer station in which individual components are each provided for receiving an injection-molded part or a group of injection-molded parts, which are displaceable and movable relative to each other, in order to take up different positions relative to each other,
a workpiece holder, and
a control means which is formed in a controlling manner of the transfer station such that the positioning of the individual components in the transfer station corresponds to the positioning of the injection-molded parts in the workpiece holder and the transfer station is moved over the workpiece holder in order to insert the injection-molded parts positioned in the transfer station directly into the workpiece holder.

Advantageously, the control means is formed in a controlling manner of the transfer station such that the Positioning of the individual components in the transfer station is adapted during the pivoting and moving of the transfer station over the workpiece holder to the positioning in the workpiece holder, by means of the workpiece holder.

The workpiece holder is preferably assembled from rod-shaped workpiece holder units, which are fixed on a carrier means, wherein the workpiece holder units can be displaced on the carrier means so that the grouping of the injection-molded parts in the workpiece holder can be adapted to packing containers to be charged and to the transfer means, by means of which the injection-molded parts are transferred from the workpiece holder into the packing containers.

According to the invention, measures described in connection with the device also apply for the method, and vice versa, method features apply for the performing device.

In the same way, the described features can be used in various combinations, without the combination of features being limited to the described embodiment.

Figure 11:
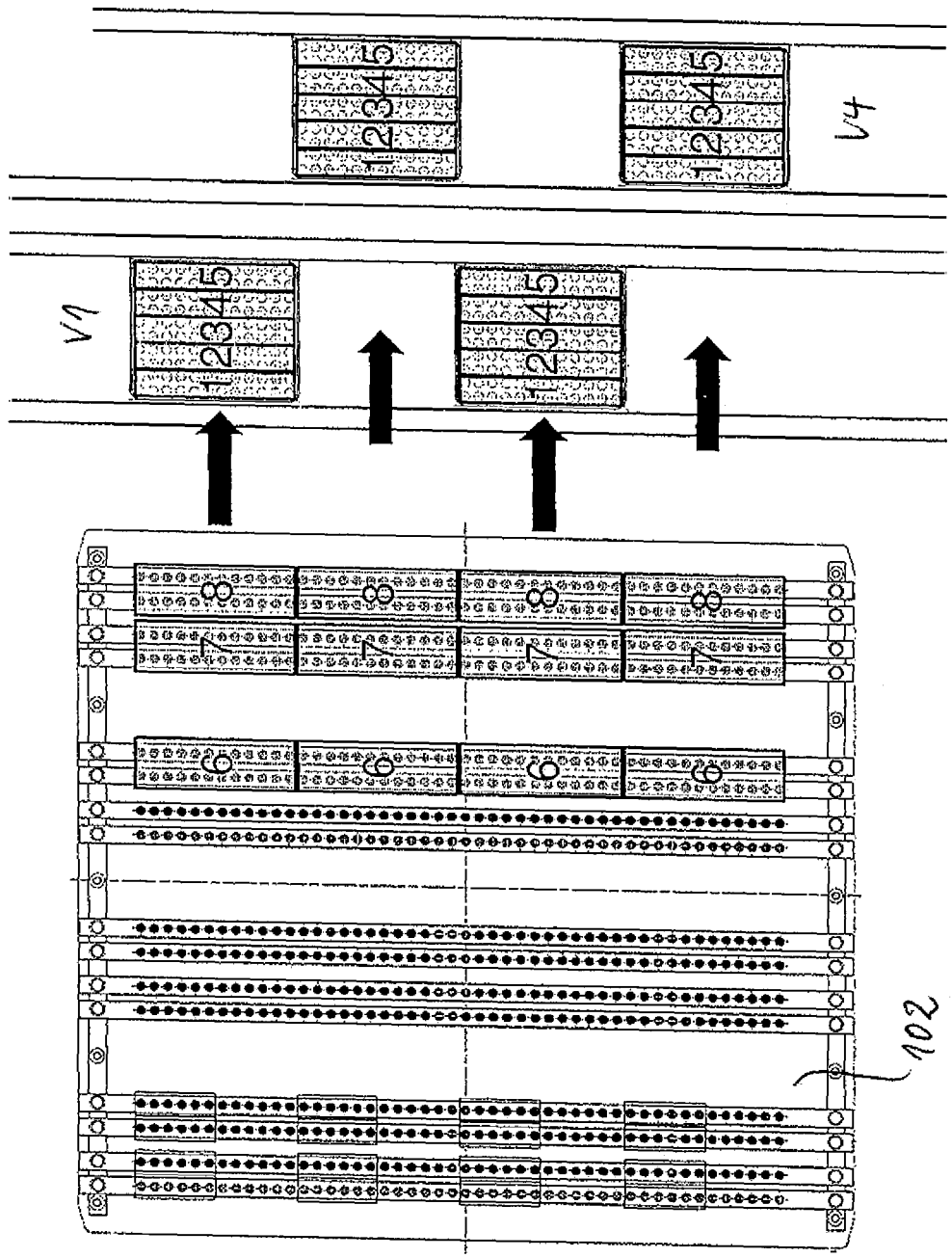
Figure 13:
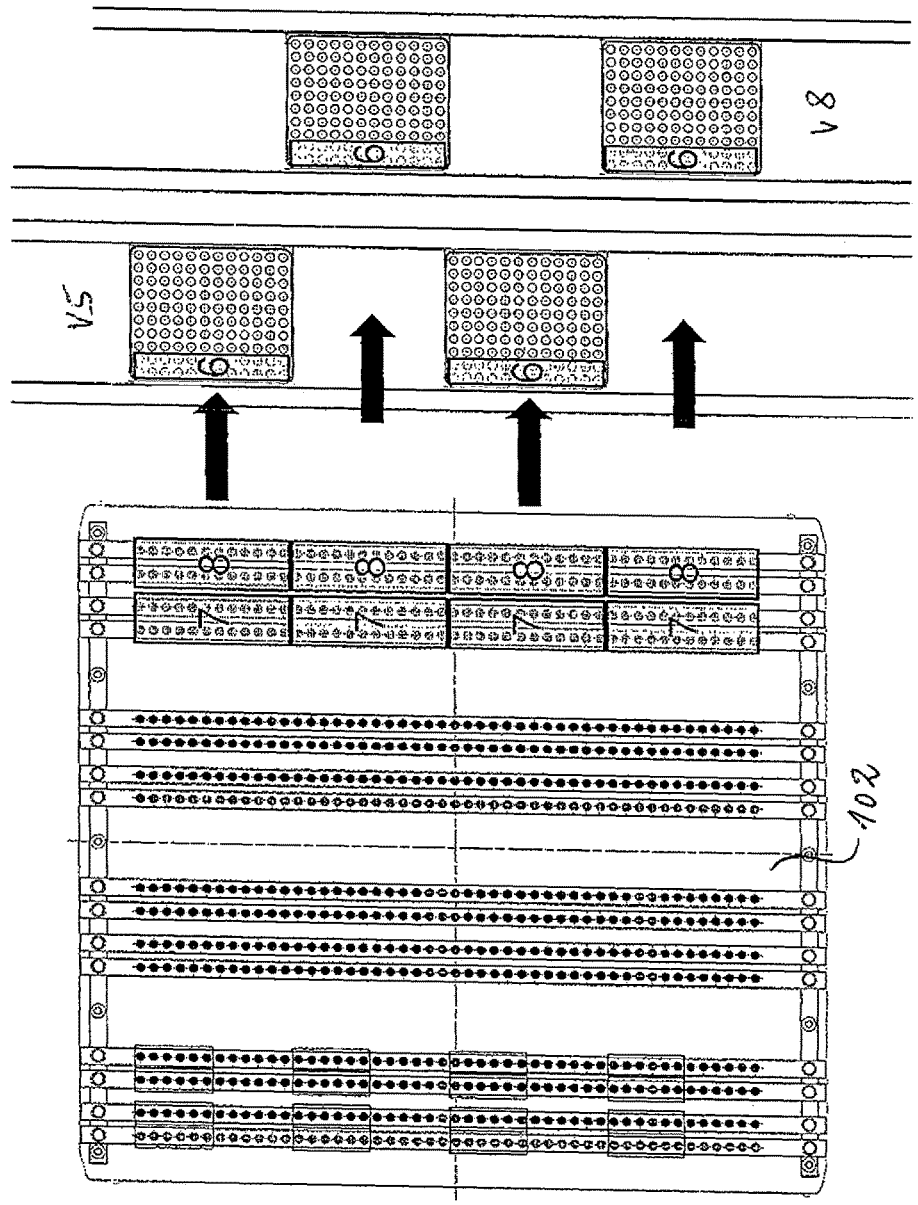
Figure 14:
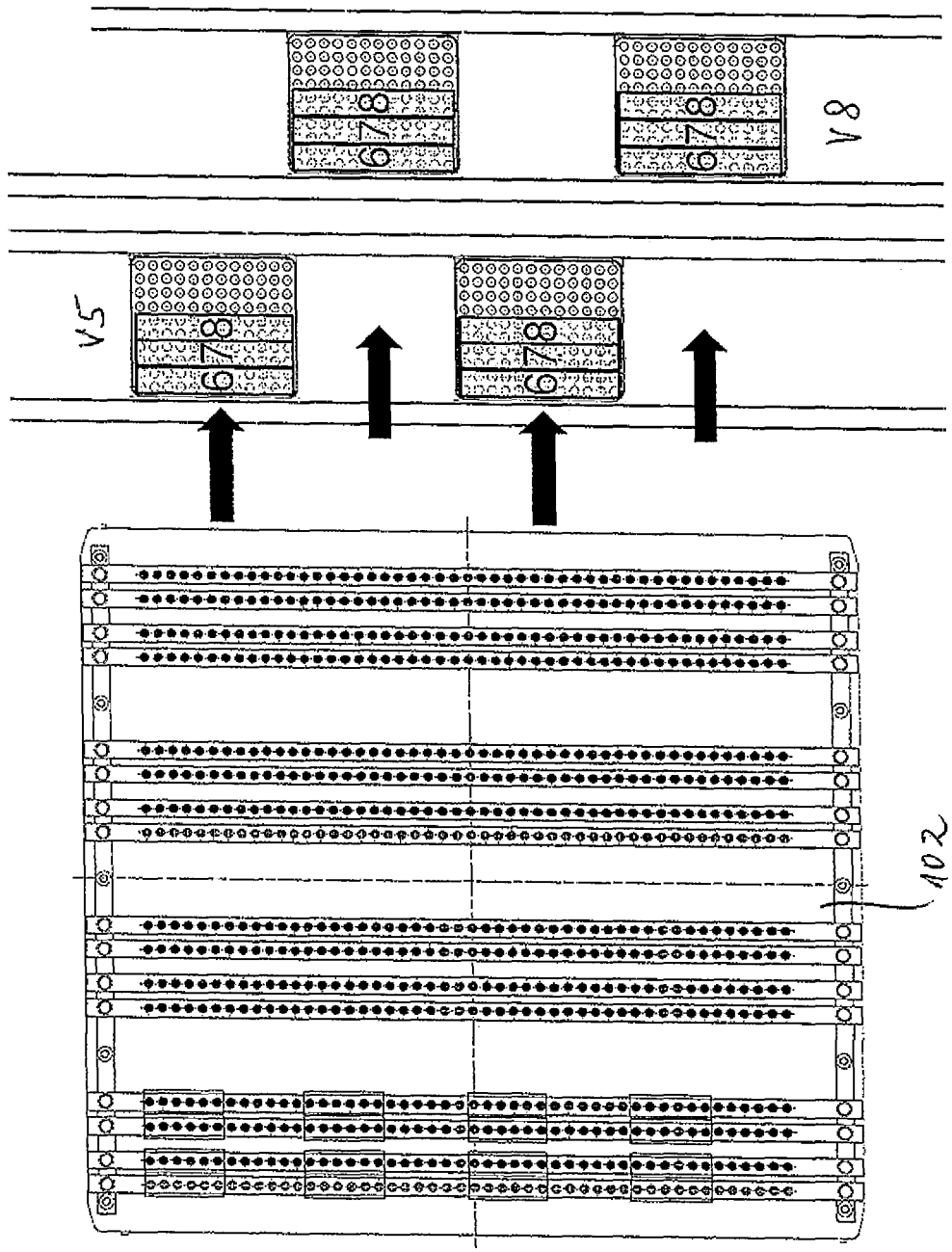
Figure 15:
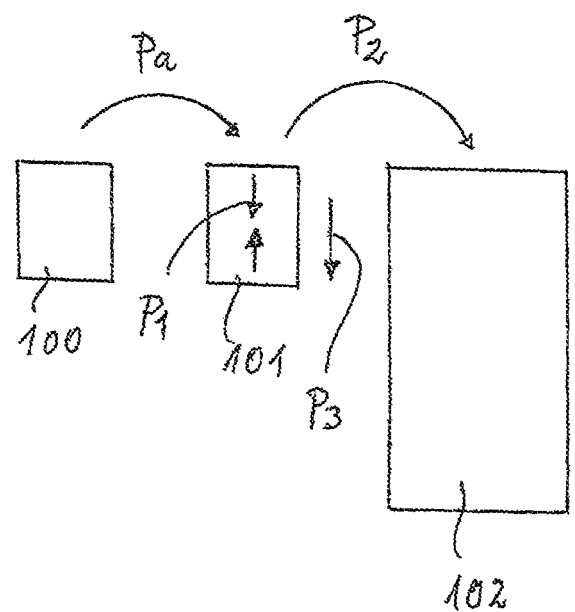

An exemplary embodiment of the invention is described in detail with reference to the drawing, in which FIG. 1 shows the annular arrangement of injection-molded parts on a withdrawal grab, FIG. 2 shows the selection of the injection-molded parts to be transferred in a first and second step into a transfer station, FIG. 3 shows the arrangement of the injection-molded parts in the transfer station after the first transfer step, FIG. 4 shows the arrangement in the transfer station after the second step, FIG. 5 shows a compaction step of the row configuration in the transfer station for adapting to the positioning in the downstream workpiece holder, FIGS. 6+6*a* show the transfer of the injection-molded parts from the transfer station onto a partly represented workpiece holder, FIGS. 7+7*a*, 7*b* show the further filling of the workpiece holder in FIG. 6 after a second shot and injection molding step, FIG. 8 shows a view of the workplace holder and allocated packing units, FIG. 9 shows a first step of the transfer of the injection molded parts from the workpiece holder into the packing containers, FIG. 10 shows the filling of the packing containers in a second step, FIG. 11 shows the filled packing containers and the partly emptied workpiece holder, FIG. 12 shows the providing of new packing containers when the workpiece holder is still partly filled, FIG. 13 shows a first step of the charging process of the new packing containers, FIG. 14 shows partly filled packing containers after emptying of the workpiece holder, and FIG. 15 shows a schematic view of the essential assemblies.

FIG. 1 shows a view of eight groups R1 to R8, arranged in an annular manner, of pipette tips P and injection molded parts 01 to 64 at a withdrawal grab 100, which is inserted between the opened tool halves of a injection molding machine, in order to receive the injection-molded parts P positioned in the injection molding tool W in the arrangement of FIG. 1 in cavities 01 to 64 of the injection molding tool, whereupon the withdrawal grab is moved out of the area of the tool halves, as is indicated by an arrow in FIG. 1. W in FIG. 1 schematically indicates a tool half of the injection molding machine.

The injection-molded parts 01 to 64 are arranged in the respective groups of rings R1 to R8 along lines, facing each other in each group of rings, which extend parallel to the coordinate lines x and y, so that in the group of rings R1, for example, the injection-molded parts 01 and 04, and 08 and 05 face each other along the y-coordinate. The same applies for the horizontal alignment, according to which the injection-molded parts 02 and 07, and 03 and 06, are arranged along a line parallel to the x-coordinate, Altogether the injection-molded parts are arranged at intersections of a network of straight intersecting lines.

FIG. 2 shows as an example the selection of four injection-molded parts 01, 04, 06 and 07, each facing each other along a coordinate line, of the group of rings R1 of eight injection-molded parts 01 to 08, which are transferred in a first step by means of the withdrawal grab 100 into a transfer station, schematically represented in FIG. 3, in the configuration of the thirty-two positions marked by means of a continuous line, so that per group of rings in each case two differently formed rows are formed in the transfer station 101, as represented at 01 to 04 and 06 to 07 in FIG. 3.

In a second step, by means of the withdrawal grab 100 the injection-molded parts P, remaining in FIG. 2 as rows 02, 03 and 05, 08, of the first group of rings R1 in the same positioning are inserted into the transfer station 101 in FIG. 3, such that the row 02, 03 of the first group of rings R1 is inserted into the row 01, 04 in the transfer station 101, and the second row 05, 08 is joined at the row 06, 07 in the transfer station, by means of which the arrangement results, as represented in FIG. 4, of two rows 01 to 04 and 05 to 08, which arose from the first group of rings R1. The same transfer of withdrawal grab 100 into the transfer station 101 takes place at the same time for the other groups of rings R2 to R8, wherein in the second step, the withdrawal grab 100 corresponding to the row distance in FIG. 2 is moved along the x-axis, so that the left-hand row in each case of the groups of rings is inserted into the second row, just as the third row is joined at the fourth and right-hand row of each group of rings.

In FIG. 4, a group of rows R1 to R8 corresponds in each case to a group of rows R1 to R8, wherein in this embodiment each group of rows comprises two rows of four, which are formed from a group of rings R1 to R8, each having eight injection-molded parts.

It is also possible to form only a row or plural rows in a group of rows, especially when a group of rings comprises more than the represented number of eight injection-molded parts.

The transfer of the groups of rings of injection-molded parts P from the withdrawal grab 100 into the transfer station 101 takes place for this embodiment such that the injection-molded parts of a group of rings R1 form a double row in the transfer station 101, so that each individual injection-molded part in the group of rows is identifiable with regard to its position in the cavities of the injection molding tool.

For example, the injection-molded parts 01 to 08, arranged in an annular manner, of the first group of rings R1 in FIG. 1 is transferred in rows into the group of rows R1 comprising two straight rows 01 to 04 and 05 to 08 in FIG. 4, so that within a group of rows it is recognizable which injection-molded part comes from which of the cavities 01 to 08 of the injection molding tool.

This transfer of the injection-molded parts from a group of rings in the withdrawal grab 100 into an in-line configuration in the transfer station 101 can also be performed by another device than by means of displacing the withdrawal grab 100 from the first row in the transfer station 101 into the second row. For example, at the withdrawal grab 100 displaceable members can be formed, having an engagement part for receiving an injection-molded part, which, after withdrawal of the injection-molded parts from the injection molding tool W, are displaced out of the annular arrangement into an in-line configuration, as is described below by means of the configuration of the transfer station 101.

For example, in the ring configuration of FIG. 2, taking the first group of rings R1 as an example, the injection-molded parts 02 and 03 can be displaced to the right in alignment with the injection-molded parts 01 and 04, so that the first row represented in FIG. 4 results, while at the same time or afterwards the injection-molded parts 06 and 07 marked by continuous lines in FIG. 2 are displaced to the left between the injection-molded parts 05 and 08 marked by interrupted ring lines, so that the second row 05 to 08 represented in FIG. 4 results.

In other words, the transfer of the injection-molded parts from a ring arrangement into an in-line configuration can be carried out in different manners.

It is also possible to move the transfer station 101 instead of the withdrawal grab 100 along the x-axis, in order to form an in-line configuration out of the withdrawal grab.

FIG. 5 shows the compaction of the eight double rows represented in FIG. 4, in which the injection-molded parts within a row have a distance from each other, to altogether eight longer rows in which the injection-molded parts are located closely adjacent to each other, wherein—as represented by black arrows—the individual rows of FIG. 4 are displaced together in longitudinal direction of the rows, that is in x-direction, so that the compacted in-line configuration represented in FIG. 5 results, in which the injection-molded parts in two blocks no. 1a and no. 1b, each having four rows comprising in each case four groups of rings and of rows R1, R2, R5, R6 and R3, R4, R7, R8, are located closely adjacent to each other in a row. The rows themselves within a block no. 1a or no. 1b can have a predetermined distance from each other or be displaced in a transverse direction, that is, along the dashed arrows. The two blocks no. 1a and no. 1b also preferably have a predetermined adjustable distance from each other.

To carry out this compaction process in FIG. 5, the transfer station 101 is preferably designed from components not shown in detail, which are displaceable relative to each other, wherein each component has a bore for receiving a pipette tip P. These individual components of the transfer station 101 are displaced relative to each other in the direction of the black arrows in FIG. 5, wherein the four receiving bores, for example corresponding to 01 to 04 of a row in FIG. 4, are displaced from top to bottom relative to each other, so that within this row the pipette tips P lie closely adjacent to each other. At the same time, the components having the bores 33 to 36 are displaced from top to bottom and the two rows 01 to 04 and 33 to 36 are compacted into a row, so that the arrangement in FIG. 5 results.

The compacting of the eight groups of rows R1 to R8 to the two blocks no. 1a and no. 1b each in longitudinal direction of the individual rows can also take place in such a way that the individual components having the bores for receiving the injection-molded parts can be displaced together only from top to bottom or only from bottom to top, in order to obtain the compacted in-line configuration in FIG. 5.

In the embodiment described, the compacting takes place only in the longitudinal direction of the rows. Compaction in the transverse direction, that is, along the x-axis is possible if this should be necessary for adapting the positioning of the injection-molded parts in the workpiece holder 102.

In this compaction step in the transfer station 101, the positioning of the injection-molded parts P is adapted to the positioning in the downstream workpiece holder 102.

The transfer station 101 is then pivoted over the workpiece holder 102 shown in FIG. 6, wherein preferably during the pivoting the above-described step of compacting is carried out.

The injection-molded parts are transferred from the transfer station 101 directly into the workpiece holder 102, for which reason the arrangement of the injection-molded parts in the transfer station 101 is compacted such that the positioning corresponds to the positioning in the workpiece holder 102.

In other words, the arrangement, shown in FIG. 5, in the transfer station 101 is transferred directly by the transfer station 101 into the configuration in FIG. 6 of the injection-molded parts 01 to 64 surrounded by a interrupted line.

FIG. 6a shows in a schematic view of the whole workpiece holder 102 the arrangement of the two blocks no. 1a and no. 1b having the no. 1 corresponding to a shot of the injection molding machine and corresponding to the injection-molded parts at the withdrawal grab 100.

During pivoting back of the transfer station 101 from the workplace holder 102 into the receiving position, in which the withdrawal grab 100 transfers the second shot from the injection molding machine into the transfer station 101, the individual components of the transfer station 101 each provided with the bore for receiving a injection-molded part, are moved into the receiving position in FIG. 4, that is the individual components are displaced apart again, so that the arrangement in FIG. 4 is adapted to the positioning of the injection-molded parts at the withdrawal grab 100. In other words, the compaction step in FIG. 5 is cancelled.

As soon as the withdrawal grab 100 has withdrawn a second shot of injection-molded parts from the injection molding machine, it is transferred, in the same way as described above, into the in-line configuration in the transfer station 101 (FIG. 4), whereupon the transfer station is pivoted, preferably while at the same time the rows are compacted in adaptation to the receiving position in the workpiece holder 102, as shown in FIG. 5.

FIG. 7 shows blocks no. 2a and no. 2b surrounded by an interrupted line, corresponding to a second shot, wherein the second shot is positioned directly abutting at the first shot in the workpiece holder 102, as FIG. 7a shows.

For inserting the second shot into the workpiece holder 102, the transfer station 101 is pivoted as described, while preferably at the same time the compaction takes place, wherein the transfer station 101 is moved thereover in the longitudinal direction of the rows in the workpiece holder 102, so that the second shot can be inserted directly abutting at the first shot in the workpiece holder 102, as FIG. 7a shows.

Thus the transfer station 101 carries out three movement processes during charging of the first two rows of the workpiece holder 102 corresponding to the blocks no. 1 no. 6 in FIG. 7b.

The first movement process is the compacting of the rows for adapting to the positioning in the workpiece holder 102.

The second movement process is the pivoting and moving of the transfer station 101 over the workpiece holder 102 with inserting of the injection-molded parts from the transfer station 101 directly into the workpiece holder 102.

The third movement takes place by means of a displacing of the transfer station 101 in the direction of the y-axis under the position of the first shot in FIG. 7a, wherein in the embodiment shown, the transfer station 101 in FIG. 5 is displaced from top to bottom, so that the positioning of the blocks nos. 2a and 2b shown in FIG. 7 is obtained.

Preferably, the second movement process of the pivoting and displacing over the workpiece holder 102 is carried out during the first movement process of compacting, in order to obtain a short cycle time.

The concentration of the courses of movement is performed in the transfer station 101, because it only receives a shot of the injection molding machine in each case and thus can have a relatively low weight.

When in the workpiece holder 102 the first two rows are filled up with the shots 1 to 6 in FIG. 7*b*, the transfer station 101 would have to be moved to the right in 7*b*, in order to transfer the third and fourth row with the shots 7 to 12 in the workpiece holder 102.

For the displacement, required for this, of the transfer station 101 along the x-axis in FIG. 5, a relatively large amount of apparatus is needed, for which reason for filling the third and fourth row of the workpiece holder 102 in FIG. 7*b* with the blocks 7 to 12, the workplace holder 102 is displaced to the left in FIG. 7*b* such that the two rows having the numbers 7 to 12 are in the position of the two rows having the numbers 1 to 6.

In this embodiment, during complete charging of the workpiece holder 102 this is moved only once in the direction of the x-axis.

As soon as the workpiece holder 102 is completely full, as FIG. 7*b* shows, it is moved into another position, so that for example a quality inspection of the injection-molded parts can be carried out.

Thereupon, an empty workpiece holder 102 is moved into the receiving position, in which the transfer station 101 transfers the injection-molded parts into the workplace holder 102.

FIG. 15 shows schematically the essential assemblies of the packing device according to the invention comprising the withdrawal grab 100, which receives a number of injection-molded parts P corresponding to a shot of the injection molding machine, the transfer station 101, which likewise receives only one shot, and the workpiece holder 102, which receives a larger number of shots, for example 1 to 12 (FIG. 7).

The withdrawal grab 100 transfers the injection-molded parts withdrawn from the injection molding tool in the ring arrangement in two steps into the transfer station 101, by means of the withdrawal grab 100 firstly being pivoted or displaced (arrow Pa) over the transfer station, whereupon the two steps are carried out by lateral displacement, wherein for each step a Predetermined number of injection-molded parts is inserted into the receiving components in the transfer station 101, in order to then to obtain an in-line configuration, as FIGS. 3 and 4 show.

After charging of the transfer station 101 having the groups of rings R1 to R8 corresponding to FIG. 4, preferably at the same time with compaction of the rows R1 to R8 (arrows P1 in FIG. 15), the transfer station 101 is pivoted over the workpiece holder 102 (arrow P2) or moved thereover such that the compacted rows of the transfer station 101 can be directly inserted into the workpiece holder 102, which has the same positioning of the injection-molded parts as the transfer station 101 after the compacting step.

For further filling of the workpiece holder 102, the transfer station 101 is moved along the arrow P3, as FIG. 7*a* also discloses.

During charging of the workpiece holder 102, the workpiece holder is displaced along the x-axis in the embodiment shown, in order to charge the third and fourth row corresponding to the shot numbers 7 to 12.

When the capacity of the workpiece holder 102 is formed smaller and comprises, for example, only the first two rows in the embodiment shown, having the shot numbers 1 to 6, then the workpiece holder 102 can also remain arranged stationary during the charging process, while the transfer station 101 is displaced in the direction of the y-axis in order to move the individual blocks nos. 1 to 6 to each other.

It is also possible to replace the third course of movement of the transfer station 101 by displacement in direction of the y-axis in FIG. 7*b* by a stepwise movement of the workpiece holder 102 towards the y-axis, especially when the workpiece holder 102 is charged only in a longitudinal direction corresponding to the y-axis, for example, with the blocks nos. 1 to 6.

Preferably, the transfer station 101 is moved into the necessary transferring position due to the lower weight.

The workpiece holder 102 can be moved, after charging in FIG. 7*b* with injection-molded parts, into a further position in which, for example, a quality inspection of the individual injection-molded parts is carried out, while an empty workpiece holder 102 is moved into the position for receiving the injection-molded parts from the transfer station 101.

The charged workpiece holders 102 can, if applicable, also be moved into a storing position and be stacked there for the further processing steps of the injection-molded parts contained in the workplace holders.

The compaction of the rows of the arrangement in FIG. 4 into the arrangement of FIG. 5 is performed such that the compacted arrangement in FIG. 5 corresponds to the arrangement in the workpiece holder 102 downstream, in FIG. 6.

By means of this compaction step, for adapting the positioning in the transfer station 101 to the positioning in the workpiece holder 102, the amount of apparatus can be simplified and a short cycle time can be obtained.

FIG. 6 shows a partial area of a workplace holder 102 completely shown in FIG. 6*a* and in FIG. 7*b*, in which longer rows of receiving bores B are formed for receiving the pipette tips P, so that a row on a workpiece holder unit for example 102.1 can receive, for example, six consecutive rows of the compacted rows shown in Figure for example with 01 to 36.

In FIG. 6, a block no. 1 is designated by interrupted lines, comprising the two blocks no. 1*a* and no. 1*b*.

The rectangles shown inside the block no. 1*a* at the workpiece holder units 102. 1 to 102.4 have nothing to do with the block layout, this concerns the constructional design of the workpiece holder 102.

In FIG. 7*b*, the blocks no. 1*a* and no. 1*b* shown in FIG. 5, of which each block comprises four groups of rings and rows R1, R2, R5, R6 and R3, R4, R7, R8, is designated as blocks having numbers 1 to 12, wherein block no. 1 corresponds to a block no. 1*a* and no. 1*b* in FIG. 5, and to a shot of the injection molding machine having the cavities 01 to 64.

The blocks no. 2 in FIG. 7*b* correspond to a second shot of the injection molding machine, wherein in each black no. 2 the same arrangement of the injection-molded parts is present as in the blocks no. 1*a* and 1*b* in FIG. 5.

In other words, in the completely filled workpiece holder 102 of FIG. 7*b*, twelve shots of the injection molding machine are contained, each having eight groups of rings R1 to R8, which are transferred in the workpiece holder 102 in groups of rows R1 to R8 per block.

Also in the arrangement in the workpiece holder 102, each injection-molded part can be identified by means of the cavity of the injection molding tool from which the relevant injection-molded part comes, so that it can be determined, during a later inspection, which cavity of the injection molding tool delivers a possibly bad injection-molded part.

The identification in the workpiece holder 102 results by means of the numbers 01, 02, . . . , which is allocated to each injection-molded part in accordance with the cavity in an electronic control unit, from which the injection-molded part comes.

In addition, there is the in-line configuration transferred from the ring arrangement of the cavities with continuous numbering during the transferring from the groups of rings into the corresponding groups of rows, so that in each case row portions arise having identical order of numbers.

The distances of the single rows in a transverse direction to the longitudinal extension are formed in the workpiece holder 102 in the same manner as in the compacted arrangement in the transfer station 101 in FIG. 5 such that the single rows may be transferred as a block without relative displacement to each other from the transfer station 101 into the workplace holder 102.

FIG. 6 shows a preferred form of realization of the workplace holder 102, whereby rod-shaped workpiece holder units 102.1 to 102.8 are provided, onto which a row of receiving bores B is formed, which are provided for receiving the injection-molded components P. The single rod-shaped workpiece holder units are mounted on their ends on a support rail 102a, for example, which are attached on an arrangement by means of fastening elements 102c, whereby the arrangement is not described in more detail. Preferably, the rod-shaped workplace holder units 102.1 to 102.8 are relative to each other displaceably attached on the support rails 102a and 102b (FIG. 8), whereby with reference numeral 102d the preferably screw like connection elements between the workpiece holder unit 102.1, 102.2, etc. and the support rail 102a are indicated.

As it has been explained, in the case of the shown example of realization, the workplace holder units 102.1 and following in FIG. 6 have in a transverse direction to the longitudinal extension preferably the same distance to each other as the compacted rows of injection-molded components shown in FIG. 5 such that the injection-molded components may as a whole be withdrawn from the transfer station 101 in FIG. 5 and may be inserted again on the workpiece holder 102 in the position shown in FIG. 6. The arrangement of the injection-molded components P and the order of the injection-molded components P in FIG. 5 correspond thereby to the arrangement order as shown in FIG. 6.

During the filling of the workpiece holder units 102.1 to 102.8 with the injection-molded components 01 to 64 of the first shot of the injection molding machine, there already takes place a second shot of the injection molding machine such that for the further filling of the workpiece holder 102 injection-molded components 01 to 64 are again available, which are withdrawn from the withdrawal grab 100 from the injection molding tool, and which are transferred in the transfer station 101 in the order shown in FIG. 5 such that in a second step of the filling of the workpiece holder 102 the two blocks of respectively four rows of FIG. 5 may be inserted on the rows of injection-molded components P into the workpiece holder units 102.1, 102.8 of FIG. 6, as shown in FIGS. 7, 7a, and 7b. The insertion of the second shot of the second injection-molded components 01 to 64 subsequently to the previously inserted injection-molded components 01 to 64 into the workpiece holder units 102.1 to 102.8 results in the picture of the total view of the workpiece holder 102 shown in FIG. 7a, whereupon the second shot in the form of two blocks with No. 2 adjacent to the first shot is inserted in the dedicated workpiece holder units 102.1 to 102.8.

FIG. 8 shows a total view of the workpiece holder 102, which has in the case of this form of realization sixteen rod-shaped workpiece holder units 102.1 to 102.16 beside two conveyer belts F1 and F2, on which packing containers V1 to V4 are arranged, which are offset to each other. The workpiece holder units are in the shown example of realization dimensioned in such a length that over the length of the workpiece holder unit six rows of eight injection-molded components from the transfer station 101 in FIG. 5 may be received, respectively. Therefore, a single workpiece holder unit in FIG. 8 comprises 48 pipette tips P or injection-molded components, whereby, from the position of the injection-molded component in the workpiece holder 102, it may be traced back, in which cavity of the injection molding tool the injection-molded component has been.

The packing containers V1 to V4 shown in FIG. 8 as an example have a capacity of 10 rows of 12 pipette tips P, respectively, whereby in FIG. 8 bores in the packing containers are indicated in a schematic manner, into which the pipette tips P are inserted.

FIG. 8 shows a workpiece holder 102, which is still empty, whereas FIG. 7b represents the workpiece holder 102, which is in total filled with twelve double blocks, in which the double blocks shown in FIGS. 6e and 7a with the numbers 1 and 2 are filled in up to the double block referred to with the No. 12.

FIG. 9 shows the transporting of the injection-molded components P from the first two workpiece holder units 102.1 and 102.2 to the four packing containers V1 to V4, which are arranged in an offset manner to each other, whereby from the first two workplace holder units one row of twelve injection-molded components are withdrawn, respectively, by means of a withdrawal grab, which is not shown, and are inserted in the direction of the arrow on the two first rows in the dedicated packing containers V1 to V4.

In the example of realization in FIG. 9, the four blocks of two rows, respectively, of twelve injection-molded components are numbered with 1 to 8 in the workpiece holder 102 as well as also in the packing containers V1 to V4.

As shown in FIG. 9 in the shown example of realization from the first row of the blocks Nos. 1 to 6 in FIG. 7b, the first two rows are withdrawn by means of a grabbing tool and are inserted as double rows with No. 1 in the packing container V1 to V4. In other words, from the completely filled workpiece holder 102 in FIG. 7b, the selection for the filling of the packing containers V1 to V4 is made such that a fast indexed or synchronized filling may take place. It is also possible to transfer instead of the first step of filling the packing containers shown in FIG. 9 at the same time with the double row No. 1 also the double row No. 2 of the first four workpiece holder units in the packing containers such that already at the first step the arrangement of FIG. 10 is achieved in the packing containers. The selection of rows from the filled workpiece holder 102 in FIG. 7b is made appropriately, depending on the test stations, which, if applicable, are arranged in intermediate positions, and which are not shown, whereby during the transferring according to FIG. 9, it is assumed that two rows of injection-molded components may be better tested as compared to one block of four rows.

The arrangement of injection-molded components 9 in the workpiece holder 102 is in fact coordinated with the arrangement in the transfer station 101 in order to simplify the transfer from the transfer station 101 the workpiece holder 102, but in fact the workpiece holder 102 is not required to be coordinated in respect to the arrangement of the injection-molded components with the type and size of the packing containers V1 to V4 such that from the filled workpiece holder 102 also different packing containers may be filled depending on requirement.

FIGS. 10 and 11 show in a sequence the steps of a transfer according to FIG. 9, whereby in FIG. 10 in a second step the transfer of the injection-molded components from the third and fourth workpiece holder units 102.3 and 102.4 in the packing containers is shown. FIG. 11 shows the completely filled packing containers V1 to V4 after five transfer steps with five blocks, respectively, including two rows with each twelve pipette tips, respectively, whereby the workpiece holder 102 is not completely emptied.

As indicated or described before, the transfer of the injection-molded components from the filled workpiece holder 102 in FIG. 7b may take place in a different manner, as shown in FIG. 9 to FIG. 11.

The transfer of the injection-molded components P takes place, respectively, in the manner of rows as soon as the ring-shaped arrangement on the withdrawal grab is transferred into an in-line configuration. The transfer from the transfer station 101 into the workpiece holder 102 as well as also the transfer from the workplace holder 102 into the packing container takes preferably place in a form of a row or line, also if the filling of the packing containers V1 to V4 may be realized in another manner, as the workpiece holder 102 provides a large reservoir of injection-molded components, which may be transferred depending on the need into the packing containers.

As indicated by means of the arrows in FIG. 9 to FIG. 11, the packing containers V1 to V4 are offset to each other in an advantageous manner on the two conveyer belts F1 and F2 with regard to each other such that the withdrawal grab, which in FIG. 9 has emptied the two first workpiece holder units, may set down the blocks of rows 1 in two steps of setting down, without a displacement in the longitudinal direction of the conveyer belt being necessary.

Since the single injection-molded components in the workpiece holder are identifiable through their dedicated numbering, which is dedicated to the number of cavity in an electronic control device, which is not shown, for identifying, from which cavity they come from, the packing containers may also be filled from the workpiece holder 102 such that preferably a smaller packing container includes only injection-molded components from a predetermined cavity. Hereby, for example, the first injection-molded component 01 from a block of the blocks No. 1 to No. 12 in a packing container is transferred such that these twelve pipette tips in one packing container come from the cavity 01 of the injection molding tool. In the same manner, also other groups of injection-molded components from the workpiece holder 102 may be selected for the filling of differently formed packing containers.

Different modifications of the described form of realization can be made. For example, all described single steps may be combined with each other in another manner.

The workpiece holder 102 can in a simplified form be shaped as a plate with bores.

In the step of compacting in the transfer station 101, also portions of the single rows may be displaced in relation to each other, or may be compacted, depending on the arrangement in the workpiece holder 102, which is to be filled. In this manner, in particular in case that the workpiece holder 102 is formed from a plate having recess bores, also predetermined groups of injection-molded components may directly be transferred in the workpiece holder 102 from the transfer station 101. In other words, the transfer station 101 being formed with an integrated function of compacting enables a forming of groups in the workpiece holder 102, which is adapted to the respective requirements or needs.

The in-line configuration in the transfer station 101 can also be compacted such that, for example, the horizontal row with injection-molded components 01 to 32 shown in FIG. 4 is compacted in a horizontal direction as well as the horizontal rows lying thereunder such that in the compacted position eight horizontal rows are arranged on top of each other, in which the injection-molded components are lying close to each other in correspondence to the positioning in the workpiece holder 102. In other words, in case of this example of realization, the compacting takes place along the x-axis, whereas in FIG. 5 the compacting takes place along the axis. In case of the compacting along the x-axis, also the transfer station 101 for filling the workpiece holder 102 may be pivoted around 90° from the position shown in FIG. 4 so that in the transfer station 101 compacted rows may directly be inserted into the workpiece holder 102.

The compacting in the transfer station 101 takes place, respectively, in adaptation to the positioning of the injection-molded components in the workpiece holder 102 such that the injection-molded components may be inserted from the transfer station 101 through the transfer station itself directly into the workpiece holder 102.

In other words, the sequences of movements of positioning (which are necessary for the fast filling of the workplace holder, are realized in the transfer station.

The invention claimed is:

1. A method for transferring injection-molded components (P) in the form of pipette tips (P) from an injection-molded machine into packaging containers (V1 to V4), comprising the following steps:
  withdrawing the injection-molded components (P) in a ring-shaped arrangement from a tool (W) of the injection molding machine by a withdrawal grab (100),
  transferring the ring-shaped arrangement into an in-line configuration of the injection-molded components (P) in a transfer station (101),
  positioning the injection-molded components (P) in the transfer station (101) according to positioning in a workpiece holder (102), and
  transporting the injection-molded components (P) into the workpiece holder (102) by means of the transfer station (101), whereupon the injection-molded components (P) from the workpiece holder (102) are inserted into the packaging containers (V1 to V4), wherein
in the withdrawal grab (100) injection-molded components (P), arranged along a straight line (Y) in an opposite manner, are withdrawn from the ring-shaped arrangement and are transferred into the in-line configuration in the transfer station (101),
whereupon the remaining injection-molded components (P) of the ring-shaped arrangement, which face each other along the straight line (Y) complete the already present in-line configuration in the transfer station (101) such that from the ring-shaped arrangement of the injection-molded components (01 to 08) on the withdrawal grab (100) at least one line or row is formed in the transfer station (101), wherein groups of rings (R1 to R8) of injection-molded components at the withdrawal grab (100) are transferred in groups of rows in the transfer station (101) such that in the groups of rows numbering of the injection-molded components (P) corresponds continuously to the numbering in the ring-shaped arrangement, wherein
the in-line configuration of the injection-molded components (P) in the transfer station (101) is compacted to a compact in-line configuration by moving single injection-molded components and/or portions of single rows in relation to each other in which the injection-molded components (P) and groups of rows of the injection-molded components have a predetermined distance to each other which corresponds to the positioning in the workpiece holder (102), wherein groups of rows (R1 to R8) in the transfer station (101) corresponding to one shot of the injection molding machine are inserted into the workpiece holder (102) such that the order of the groups of rings in the injection molding tool corresponds to the order of groups of rows in the workpiece holder (102), whereby the transfer station repeatedly charges the workpiece holder (102), and wherein, the workpiece holder (102) is designed by means of rod-shaped workpiece holder units (102.1, 102.2, ...), having receiving holes (B) for the injection-molded components (P), the rod-shaped workpiece holder units (102.102.2, ...) are attached to a support device (102a) in a manner displaceable relative to each other.

2. The method according to claim 1, wherein one of the group of rings (R1 to R8) in the injection molding tool corresponding to a one of the group of rows in the workpiece holder (102) are transferred in such a row in the packaging container (V1 to V4) such that in a packaging container those groups of rows are inserted, which corresponds to the one group of rings (R1 to R8) in the injection molding tool.

3. The method of claim 1, wherein the transfer station (101) is pivoted or moved over the workpiece holder (102) and the injection-molded components (P) are inserted by the transfer station (101) directly into the workpiece holder (102).

4. The method of claim 3, wherein the compacting of the in-line configuration or the positioning of the injection-molded components (P) in the transfer station (101) is made during the pivoting or moving of the transfer station (101) over the workpiece holder (102).

5. The method of claim 1, wherein the workpiece holder (102) is moved in a transverse direction to the group of rows in the transfer station (101) to transfer the group of rows to the workpiece holder (102).

6. A packaging device comprising:
a withdrawal grab (100) with groups of cavities in a ring-shaped arrangement for receiving injection-molded components (P) in correspondence with the ring-shaped arrangement of the injection-molded components in an injection molding tool (W),
a transfer station (101) for receiving the injection-molded components (P) or a group of injection-molded components (P) from the withdrawal grab,
a workpiece holder (102), and
a control device which controls the transfer station (101) such that the positioning of the injection-molded component in the transfer station (101) corresponds to the positioning in the workpiece holder (102), and the transfer station (101) is moved or pivoted over the workpiece holder (102) in order to insert the injection-molded components from the transfer station (101) into the workpiece holder (102), wherein the control device controls the withdrawal grab (100) such that the withdrawal grab (100) transfers the ring-shaped arrangement of the injection-molded components (P) in at least two steps into an in-line configuration in the transfer station (101), wherein the workpiece holder (102) is designed by means of rod-shaped workpiece holder units (102.1, 102.2 ...) having receiving holes (B) for the injection-molded components (P) the rod-shaped workpiece holder units (102.1 102.2 ...) are mounted displaceable relative to each other on a support device (102a).

7. The packaging device according to claim 6, wherein the withdrawal grab (100) has an intake capacity of injection-molded components (P) corresponding to a number of components (P) produced by one injection-molding step of the injection molding tool (W), wherein the transfer station (101) has an intake capacity of injection-molded components (P) corresponding to one injection-molding step and the workpiece holder (102) has a capacity of injection molded components corresponding to several injection-molding steps of the injection molding tool (W).

* * * * *